US010922538B2

United States Patent
Honda

(10) Patent No.: US 10,922,538 B2
(45) Date of Patent: Feb. 16, 2021

(54) INFORMATION PROCESSING APPARATUS THAT DETERMINES WHETHER A PDF FILE IS SEARCHABLE, AND METHOD AND STORAGE MEDIUM THEREOF

(71) Applicant: CANON KABUSHIKI KAISHA, Tokyo (JP)

(72) Inventor: Kinya Honda, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 185 days.

(21) Appl. No.: 16/141,278

(22) Filed: Sep. 25, 2018

(65) Prior Publication Data
US 2019/0102618 A1 Apr. 4, 2019

(30) Foreign Application Priority Data

Oct. 3, 2017 (JP) .................. 2017-193518
Jul. 25, 2018 (JP) .................. 2018-139489

(51) Int. Cl.
G06K 9/00 (2006.01)
(52) U.S. Cl.
CPC ..... *G06K 9/00469* (2013.01); *G06K 2209/01* (2013.01)
(58) Field of Classification Search
None
See application file for complete search history.

(56) References Cited

U.S. PATENT DOCUMENTS

| 2005/0256868 | A1* | 11/2005 | Shelton | ................... G06F 16/34 |
| 2008/0231879 | A1* | 9/2008 | Takemoto | .......... G06K 9/00483 358/1.13 |
| 2016/0005202 | A1 | 1/2016 | Yamazaki et al. | ....... G06T 11/60 |
| 2017/0351913 | A1* | 12/2017 | Chen | ....................... G06K 9/46 |

FOREIGN PATENT DOCUMENTS

JP 2011-010232 1/2011

* cited by examiner

Primary Examiner — Justin P. Misleh
(74) Attorney, Agent, or Firm — Venable LLP

(57) ABSTRACT

An object of the present invention is to determine whether a PDF file is an SPDF file without using a special command. The present invention is an information processing apparatus including: at least one processor that executes the instructions, the instructions, when executed, causing the information processing apparatus to perform operations including: first extracting to extract a character area within an image object included in a file; first determining to determine whether the file is a searchable file including an image and results of character recognition corresponding to the image based on a position relationship between the character area extracted by the first extracting and an area in which a character object included in the file is drawn; and generating to generate a file including results of character recognition processing by performing the character recognition processing for the image object.

6 Claims, 18 Drawing Sheets

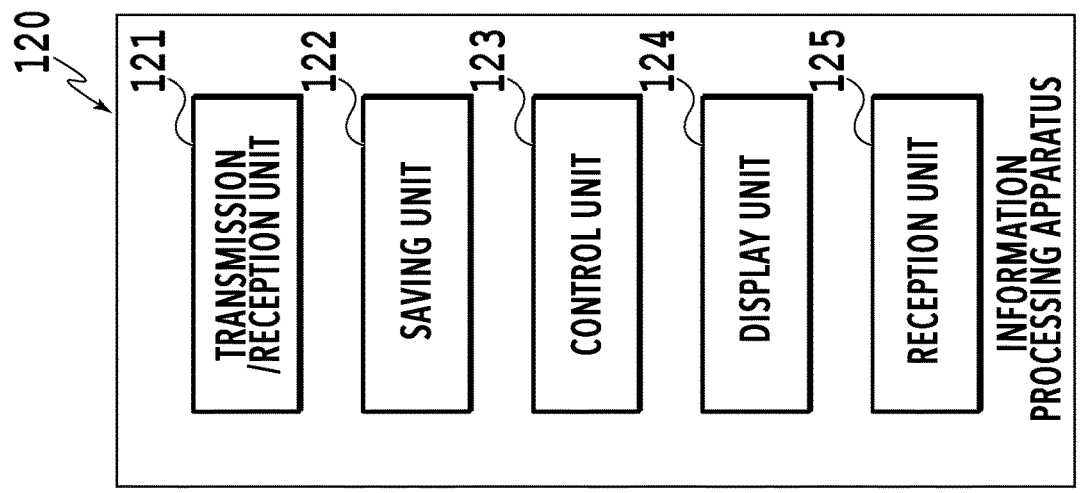
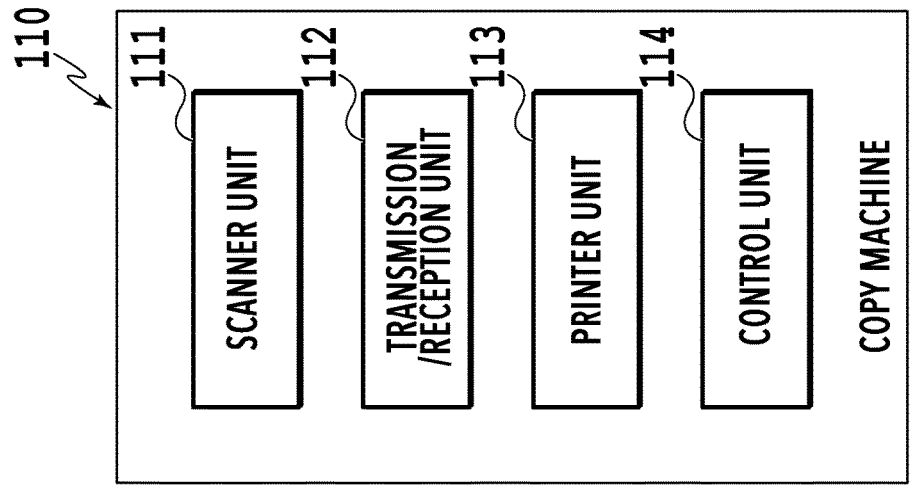
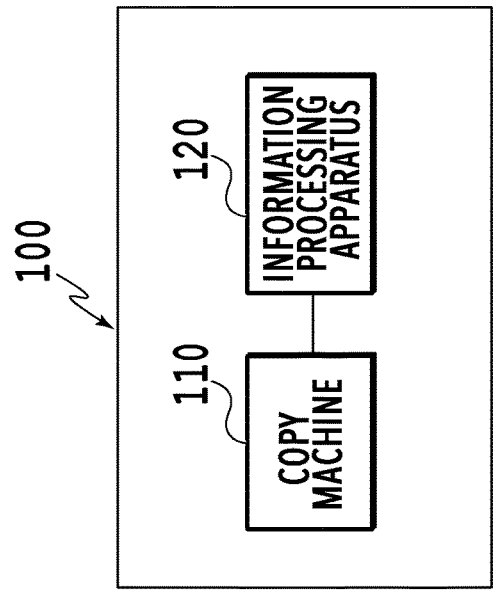

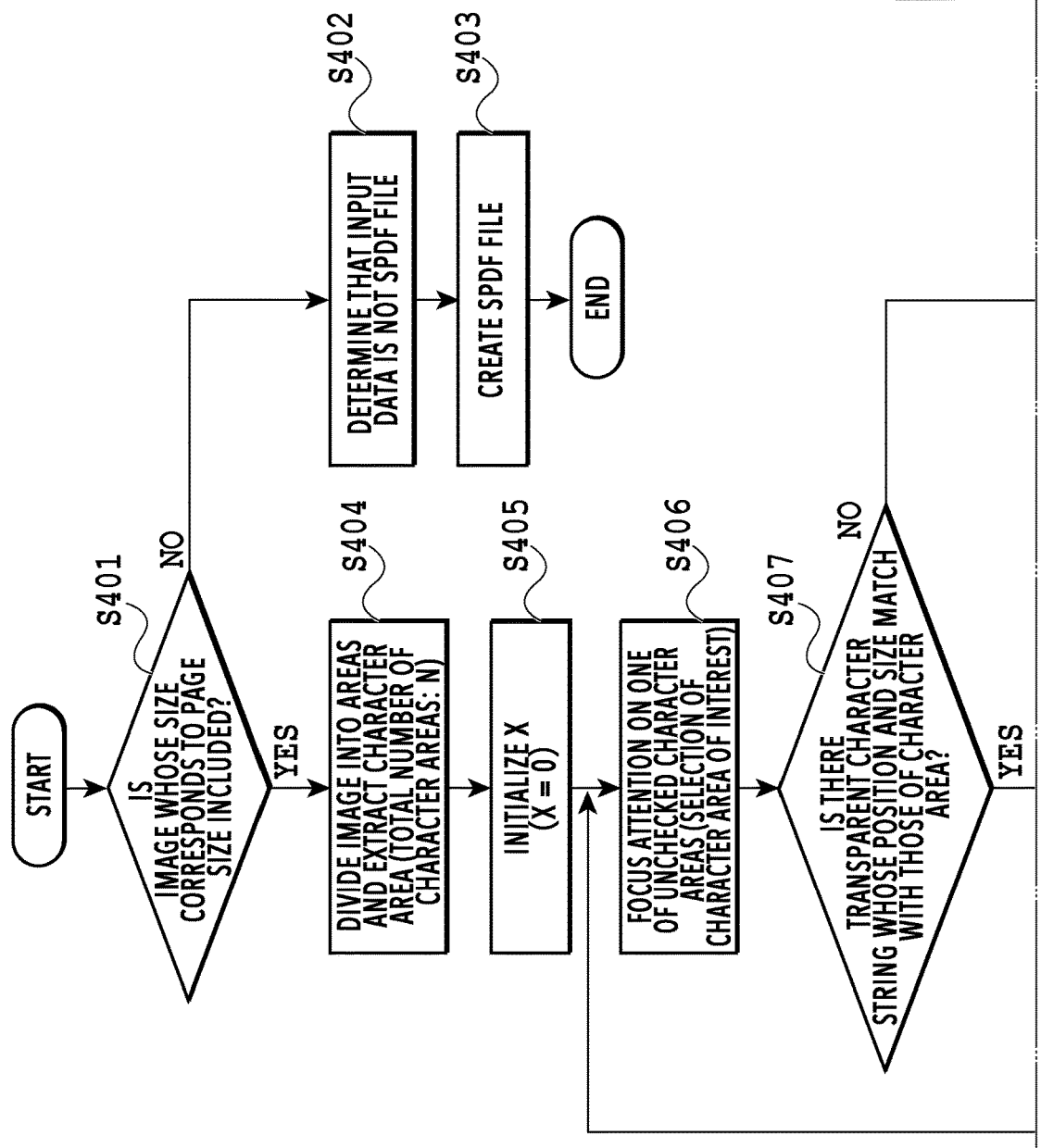

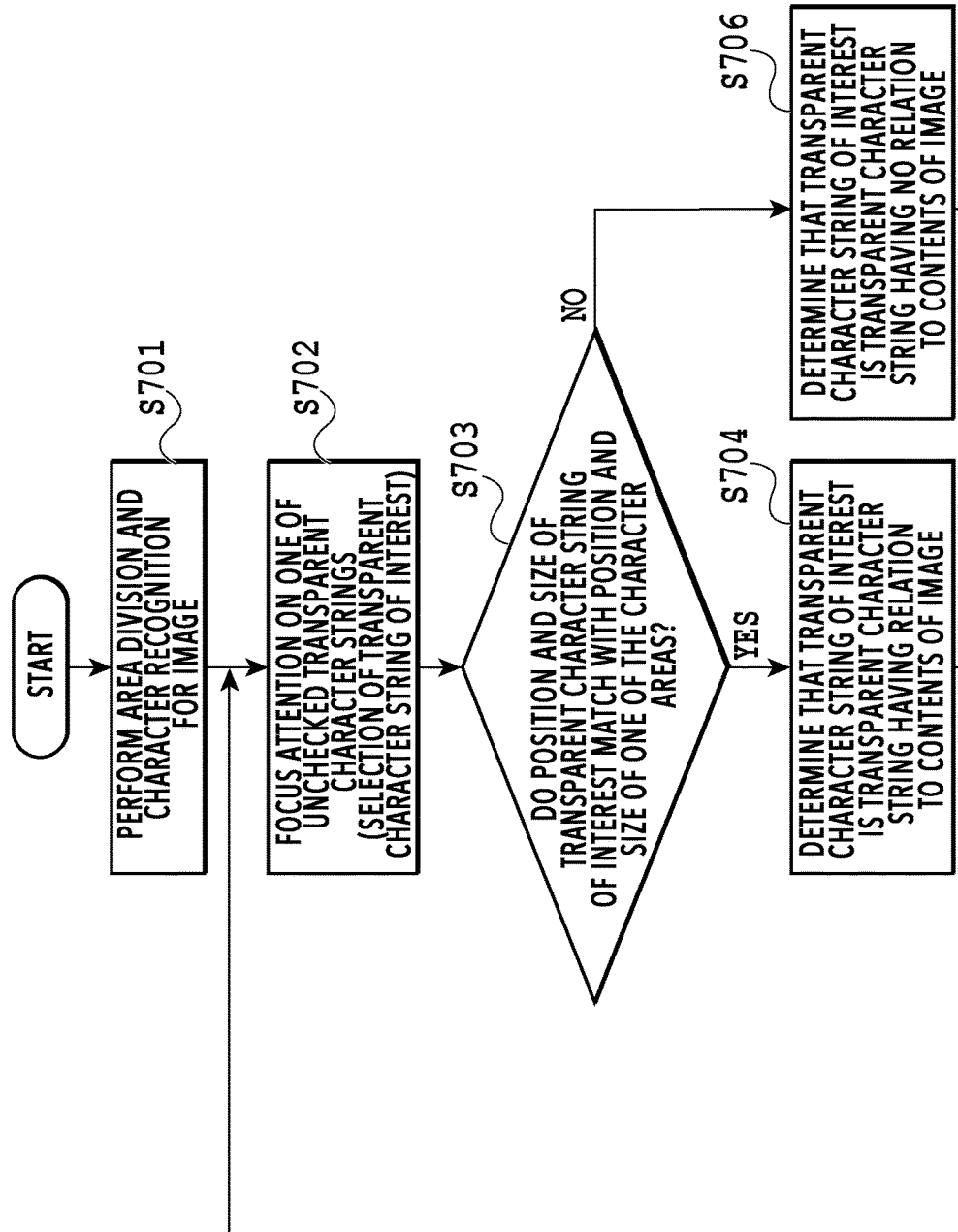

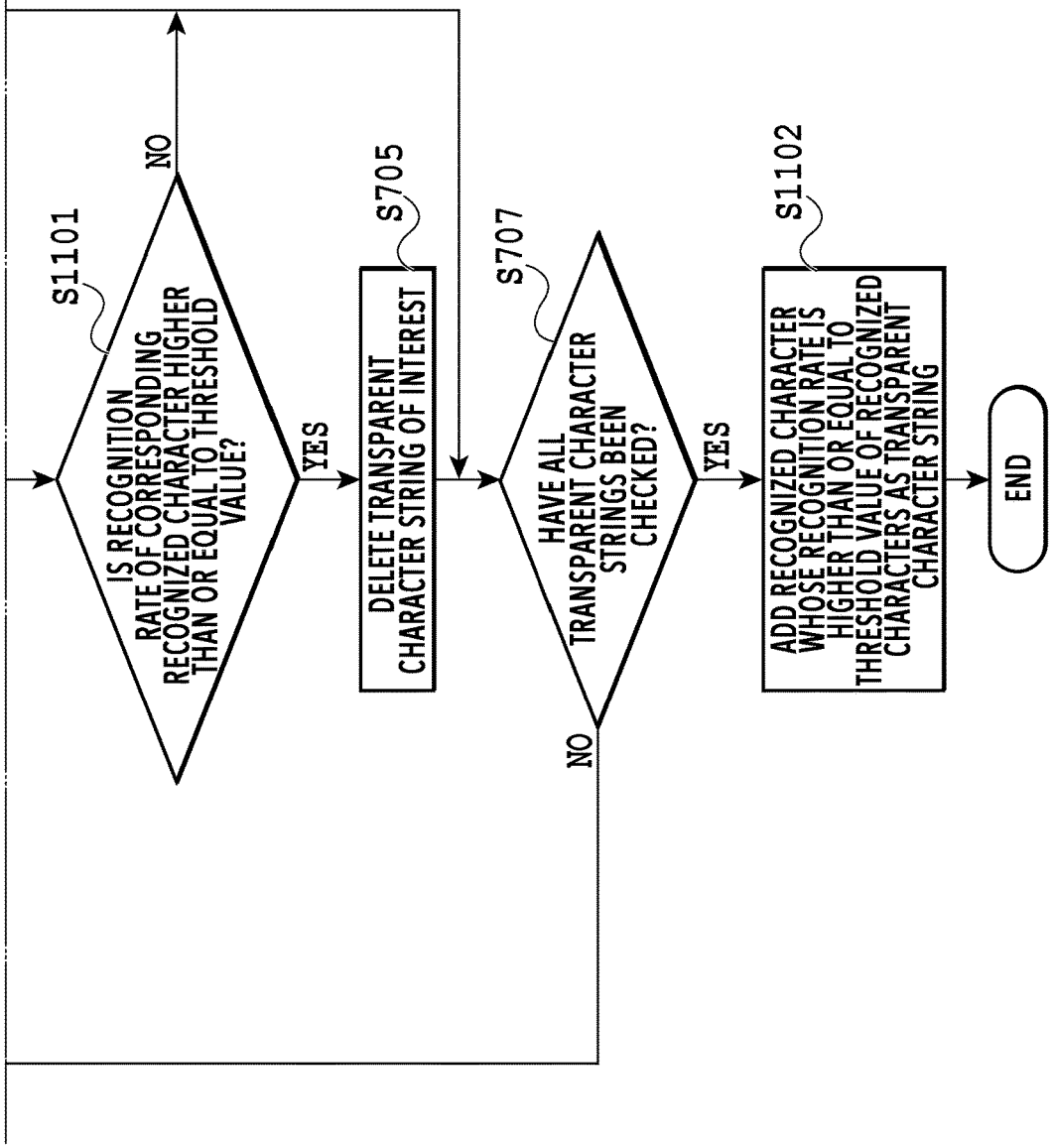

INFORMATION PROCESSING APPARATUS THAT DETERMINES WHETHER A PDF FILE IS SEARCHABLE, AND METHOD AND STORAGE MEDIUM THEREOF

BACKGROUND OF THE INVENTION

Field of the Invention

The present invention relates to an information processing apparatus that recognizes a character string in an image within a file and generates a searchable file, a method, and a storage medium.

Description of the Related Art

Conventionally, there is software that creates a searchable PDF file (hereinafter, SPDF file) in which a character string is searchable. FIG. 2 shows an example of an SPDF file. In an SPDF file 201, a scanned image 202 is included. Further, in the SPDF file 201, a transparent character string is embedded in alignment with the position of a character image within the scanned image so as to overlap the scanned image. For example, character codes of a character string are described in a PDF (Portable Document Format) file so that a transparent character string of "200,000" is arranged on the front side or backside of a character image 203 within the scanned image. Further, although not shown schematically, character codes of transparent character strings corresponding to all the character images other than the character image 203 within the scanned image are also described in the PDF file. Only by the character images within the scanned image, it is not possible to search for a character string, but by embedding character codes obtained as the results of character recognition processing as a transparent character string at the position corresponding to the character image, it is made possible to search for a character string without changing the appearance of the scanned image. As described above, the software that creates an SPDF file performs character recognition processing for a scanned image and adds character codes obtained as the results thereof to the PDF file as a transparent character string.

A PC in which software that creates an SPDF file is installed receives a scanned image created by a copy machine or software, or a PDF file including an image and creates an SPDF file by using the received data. However, depending on the copy machine, it is also possible for the copy machine itself to create an SPDF file and there is a case where as input data to a PC that executes the software that creates an SPDF file, an SPDF file created by a device other than the PC including the copy machine is input. In this specification, "input data" means data of source of creation at the time of creating an SPDF file and an SPDF file is created base on input data. As input data, for example, a scanned image created by a copy machine, a PDF file including an image, such as a scanned image, an SPDF file, or the like is considered.

Here, the file extension of an SPDF is "pdf" and this is the same as the file extension of the PDF, in which a character string is not searchable, and therefore, such a problem occurs that it is not possible to determine whether or not the PDF file of input data is an SPDF file based on the file extension.

As one method for resolving this problem, Japanese Patent Laid-Open No. 2011-010232 has disclosed a technique to make it possible to determine whether or not a PDF file is an SPDF file by embedding a command for reporting that the file is a searchable file in the file.

SUMMARY OF THE INVENTION

However, already-existing software or a copy machine, which creates an SPDF file, does not have the function as in Japanese Patent Laid-Open No. 2011-010232, which embeds a command for reporting that the file is an SPDF file in the file. The reason is that there is no definition for identifying whether or not the file is an SPDF file in the definition of the PDF format. For a DPF file created and transmitted by the already-existing software not having the function to embed such a command in a file, it is not possible for the device side to which the PDF file is input to determine whether or not the PDF file of the input data is an SPDF file.

Further, it is also considered to determine whether or not the input data is an SPDF file by simply taking whether or not there is a transparent character string within the input data as a reference, but this determination reference is not appropriate because of the following reason. FIG. 3 is a diagram showing an example in which a transparent character string having no relation to the contents of the image is embedded. Depending on the way a user performs an operation, there is a case where a user embeds information, such as an ID for identifying a user, in the image as a transparent character string 320. As described above, there is a case where a transparent character string having no relation to the character image within a scanned image exists within a file, and therefore determining whether or not the input data is an SPDF file by taking whether or not there is a transparent character string within the input data as a reference is not appropriate from the viewpoint of accuracy.

Consequently, in view of the above-described problem, an object of the present invention is to determine whether or not a PDF file is an SPDF file with a high accuracy without using a command for reporting that a file is a searchable file.

The present invention is an information processing apparatus including: a memory device that stores a set of instructions; and at least one processor that executes the instructions, the instructions, when executed, causing the information processing apparatus to perform operations including: first extracting to extract a character area within an image object included in a file; first determining to determine whether or not the file is a searchable file including an image and results of character recognition corresponding to the image based on a position relationship between the character area extracted by the first extracting and an area in which a character object included in the file is drawn; and generating to generate a file including results of character recognition processing by performing the character recognition processing for the image object in accordance with that the first determining determines that the file is not a searchable file.

Further features of the present invention will become apparent from the following description of exemplary embodiments with reference to the attached drawings.

BRIEF DESCRIPTION OF THE DRAWINGS

FIG. 1A, FIG. 1B, and FIG. 1C are block diagrams showing a configuration of a system and the like in a first embodiment;

FIG. 4A and FIG. 4B are flowcharts of SPDF file creation processing accompanied by PDF file determination processing in a first embodiment;

FIG. 11A and FIG. 11B are flowcharts of processing in a fifth embodiment;

DESCRIPTION OF THE EMBODIMENTS

First Embodiment

<About Configuration of System>

Figure 2:
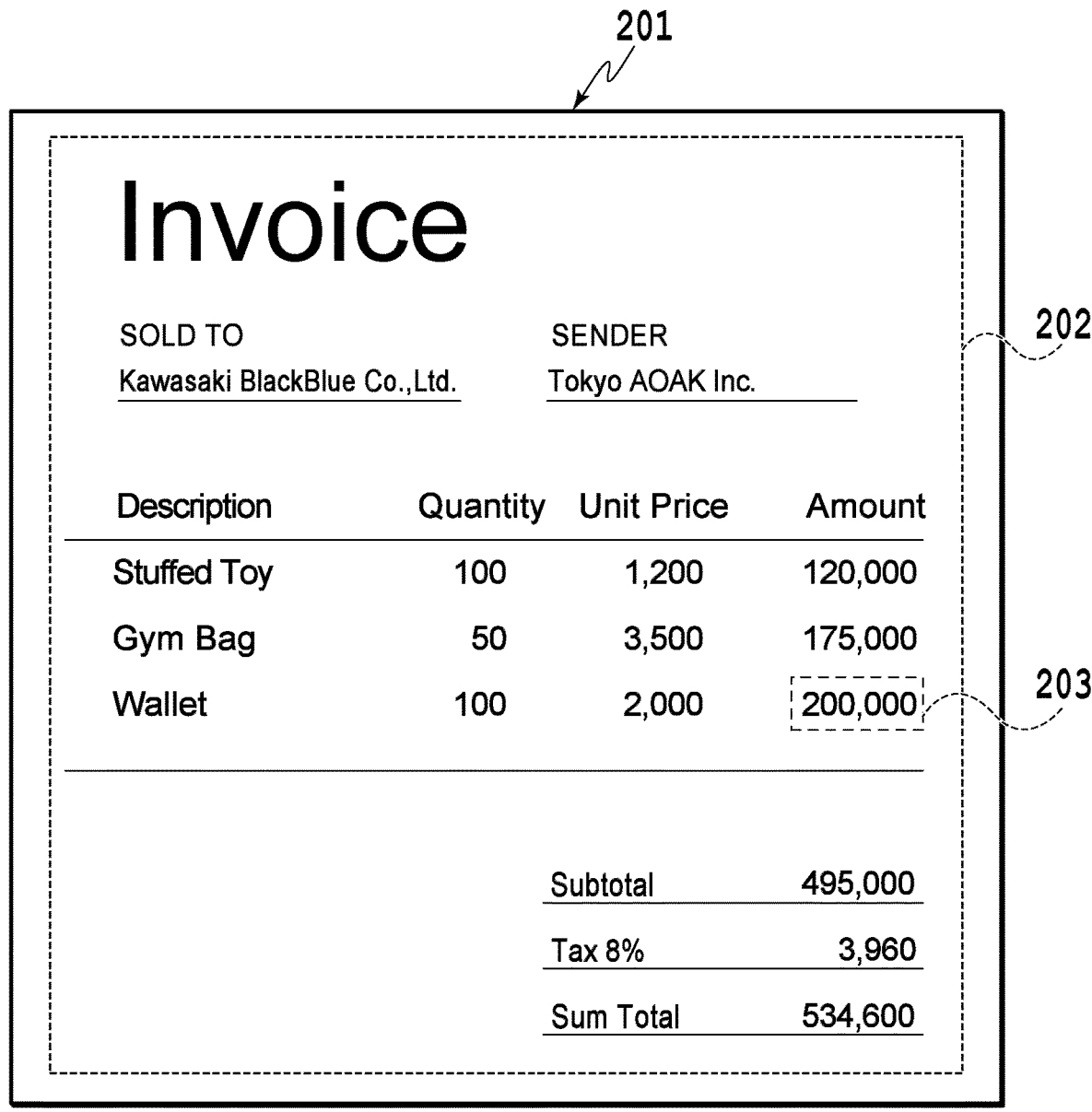
FIG. 2 is a diagram showing an example of an SPDF file.

In the following, a configuration of a system in the present embodiment is explained by using FIG. 1A, FIG. 1B, and FIG. 1C.

FIG. 1A is a block diagram showing a system in the present embodiment. As shown schematically, a system 100 has a copy machine 110 and an information processing apparatus 120. The copy machine 110 and the information processing apparatus 120 are connected by a wire or wirelessly and it is possible to perform transmission and reception of data with each other.

FIG. 1B is a block diagram showing a function configuration of the copy machine 110. The copy machine 110 has a scanner unit 111, a transmission/reception unit 112, a printer unit 113, and a control unit 114.

FIG. 1C is a block diagram showing a function configuration of the information processing apparatus 120. The information processing apparatus 120 has a transmission/reception unit 121, a saving unit 122, a control unit 123, a display unit 124, and a reception unit 125. The information processing apparatus 120 internally has a CPU, storage media, such as a ROM and a hard disk, and a temporary storage medium, such as a RAM, and programs stored in the ROM are loaded onto the RAM and the CPU executes the loaded programs. Due to this, each configuration shown in FIG. 1C is implemented and processing by each of the configurations is performed. The reception unit 125 generally has an aspect in which a keyboard and a mouse are included, but the aspect is not limited to this aspect. Further, here, the display unit 124 and the reception unit 125 are separate configurations, but the display unit 124 and the reception unit 125 may be implemented as one integrated unit by, for example, a touch panel and the like.

<About Flow from Scan of Document to Creation of SPDF File>

In the following, a flow of creating an SPDF file by the information processing apparatus 120 by scanning a document by the copy machine 110 is explained. In the case where the scanner unit 111 of the copy machine 110 scans a document, a scanned image (also called scanned image data) is created. The transmission/reception unit 112 transmits the created scanned image to the information processing apparatus 120. Then, the transmission/reception unit 121 of the information processing apparatus 120 receives the scanned image and the control unit 123 saves the received scanned image in the saving unit 122.

A user selects one scanned image from one or a plurality of scanned images saved in the saving unit 122 via the reception unit 125. Then, the control unit 123 displays the scanned image on the display unit 124.

A user gives instructions to create an SPDF file based on the scanned image displayed on the display unit 124 via the reception unit 125. Then, the control unit 123 creates an SPDF file by performing the following processing, that is, area division described (1) to (5), character recognition described in (6), and embedment of a transparent character string described in (7), and saves the created SPDF file in the saving unit 122.

<About SPDF File Creation Processing Based on Scanned Image>

In the following, processing to create an SPDF file based on a scanned image is explained in detail.

(1) Binarization

The control unit 123 obtains a binary image including only black pixels and white pixels by performing binarization for a scanned image. By binarization, a pixel having a density value larger than or equal to a predetermined threshold value in a scanned image becomes a black pixel and a pixel having a density value smaller than the predetermined threshold value becomes a white pixel. In the following, explanation is given on the assumption that the scanned image has a resolution of 100 dpi, but it is needless to say that the scanned image is not limited to this resolution.

(2) Detection of Cluster of Black Pixels

The control unit 123 detects a cluster of black pixels (referred to as black pixel cluster) existing continuously in one of eight directions by tracking a contour of black pixels connected in eight linkage for a binary image. The eight linkage means that pixels in the same color (black in this case) continue in one of the eight directions, that is, the upward to the left direction, the leftward direction, the downward to the left direction, the downward direction, the downward to the right direction, the rightward direction, the upward to the right direction, and the upward direction. On the other hand, four linkage means that pixels in the same color continue in one of the four directions, that is, the leftward direction, the downward direction, the rightward direction, and the upward direction. In the present embodiment, a single black pixel, of which any of eight adjacent pixels existing in the eight directions is not a black pixel, is not detected as a black pixel cluster. On the other hand, a black pixel, of which at least one of eight adjacent pixels existing in the eight directions is a black pixel, is detected as a black pixel cluster, together with the adjacent black pixel. Symbol 1201 in FIG. 12 indicates an example of a black pixel cluster detected by the control unit 123.

Further, the control unit 123 derives position information on a circumscribed rectangle of a detected black pixel cluster, specifically, an X-coordinate and a Y-coordinate of each of four vertexes of the circumscribed rectangle. It is assumed that the X-axis extends in the rightward direction and the Y-axis extends in the downward direction. Symbol 1202 in FIG. 12 indicates the circumscribed rectangle of the black pixel cluster 1201. In the case where a "rectangle" is represented without any particular notice in the present specification, a rectangle facing in a diagonal direction is not included and it is assumed that a rectangle whose four sides are parallel to the X-axis or the Y-axis is represented.

(3) Detection of Table Area

The control unit 123 determines whether each of the detected black pixel clusters satisfies all three conditions described below and determines a black pixel cluster that satisfies all the three conditions as a black pixel cluster making up a frame line of a table. In the following, the three conditions are explained.

The first condition is that the width of the circumscribed rectangle of a black pixel cluster is greater than or equal to a predetermined threshold value and the height of the circumscribed rectangle is greater than or equal to a threshold value. In the present embodiment, it is assumed that the "width" indicates the length in the X-direction and the "height" indicates the length in the Y-direction. In the present embodiment, whether both the width and the height are greater than or equal to 0.25 cm, corresponding to 100 pixels.

The second condition is that the filling rate of the black pixel cluster inside the circumscribed rectangle is lower than or equal to a threshold value. In the present embodiment, whether the ratio of the black pixel cluster to the circumscribed rectangle is lower than or equal to 20% is determined.

The third condition is that both a difference between the maximum width of the black pixel cluster and the width of the circumscribed rectangle and a difference between the maximum height of the black pixel cluster and the height of the circumscribed rectangle are small. Specifically, the third condition is that a difference between the maximum width of the black pixel cluster and the width of the circumscribed rectangle is smaller than or equal to a predetermined threshold value and a difference between the maximum height of the black pixel cluster and the height of the circumscribed rectangle is smaller than or equal to a predetermined threshold value. In the present embodiment, whether both a difference between the maximum width of the black pixel cluster and the width of the circumscribed rectangle and a difference between the maximum height of the black pixel cluster and the height of the circumscribed rectangle are less than or equal to 10 pixels is determined.

The control unit 123 determines whether the black pixel cluster is a black pixel cluster making up a frame line of a table by determining whether each of the black pixel clusters satisfies the first to third conditions described above, and saves position information on the circumscribed rectangle of the black pixel cluster making up a frame line of a table in the saving unit 122. The area of the circumscribed rectangle having position information thus saved is called a table area. In the case shown in FIG. 12, it is assumed that the black pixel cluster 1201 is determined to be a black pixel cluster making up a frame line of a table and the area of the circumscribed rectangle 1202 is detected as a table area as results of detection of a table area. In the present embodiment, the black pixel cluster that satisfies all the first to third conditions described above is determined to be a black pixel cluster making up a frame line of a table, but the determination conditions are not limited to those. For example, it may also be possible to determine a black pixel cluster that satisfies at least one of the first to third conditions described above to be a black pixel cluster making up a frame line of a table.

(4) Specification of Recognized Cell

The control unit 123 specifies a recognized cell inside the table area. Here, the "recognized cell" is a circumscribed rectangle of a white pixel cluster inside the table area. In order to specify a recognized cell, it is necessary to detect a white pixel cluster by tracking the contour of the white pixel inside the table area. After this, the control unit 123 determines whether each of the detected white pixel clusters satisfies three conditions described below and specifies a circumscribed rectangle of the white pixel cluster that satisfies all the three conditions as a recognized cell.

The first condition is that the width of a circumscribed rectangle of the white pixel cluster is greater than or equal to a predetermined threshold value and the height of the circumscribed rectangle is greater than or equal to a predetermined threshold value. In the present embodiment, whether both the width and the height are greater than or equal to 20 pixels is determined.

The second condition is that the filling rate of a black pixel cluster inside the circumscribed rectangle is lower than or equal to a predetermined threshold value. In the present embodiment, whether the ratio of the black pixel cluster to the circumscribed rectangle is lower than or equal to 20% is determined.

The third condition is that both a difference between the maximum width of the white pixel cluster and the width of the circumscribed rectangle and a difference between the maximum height of the white pixel cluster and the height of the circumscribed rectangle are small. Specifically, the third condition is that a difference between the maximum width of the white pixel cluster and the width of the circumscribed rectangle is smaller than or equal to a predetermined threshold value and a difference between the maximum height of the white pixel cluster and the height of the circumscribed rectangle is smaller than or equal to a predetermined threshold value. In the present embodiment, whether both a difference between the maximum width of the white pixel cluster and the width of the circumscribed rectangle and a difference between the maximum height of the white pixel cluster and the height of the circumscribed rectangle are smaller than or equal to five pixels is determined.

Figure 12:
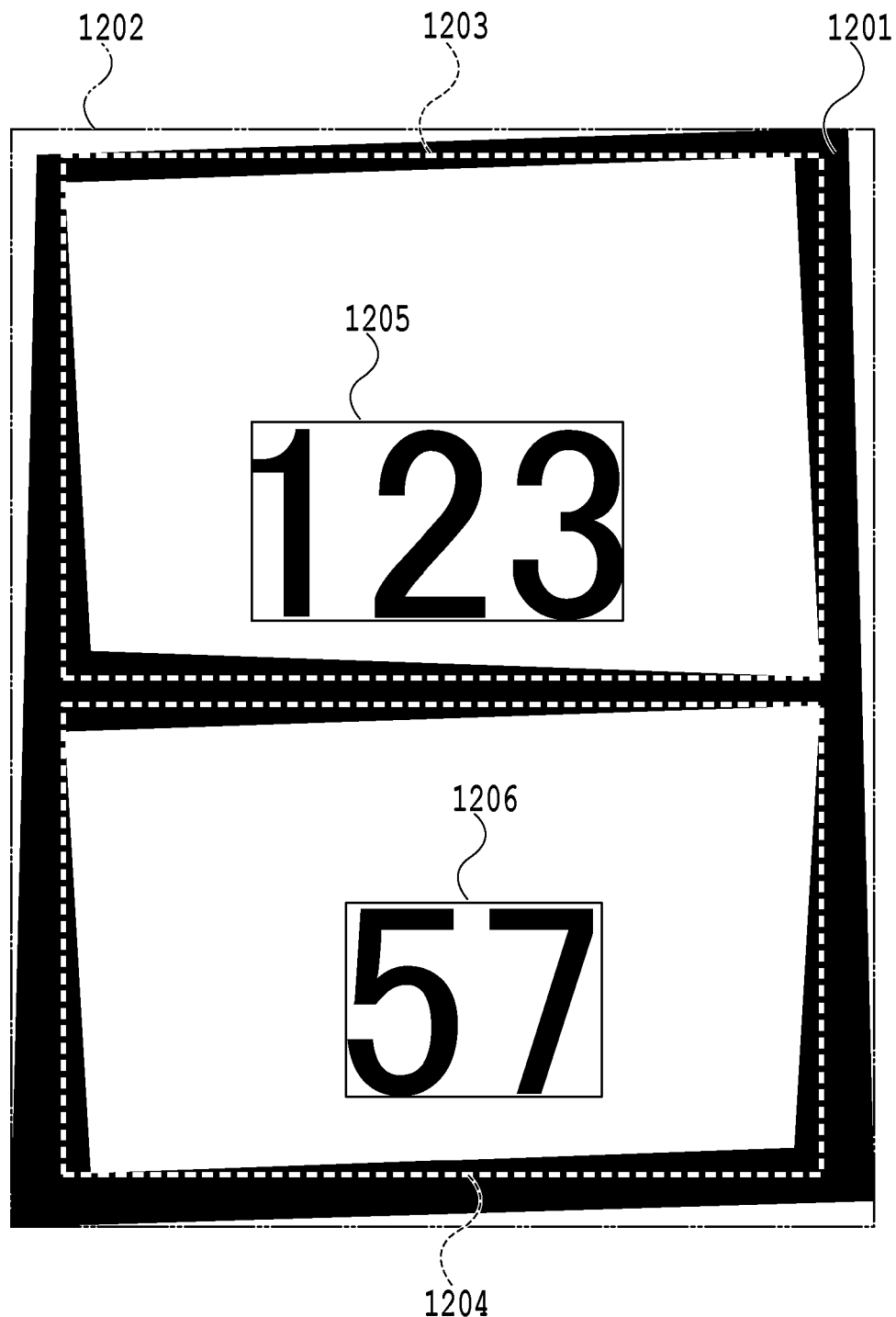
FIG. 12 is an explanatory diagram of a recognized cell.

Symbols 1203 and 1204 in FIG. 12 indicate recognized cells specified by the control unit 123. The control unit 123 saves position information on the specified recognized cell in the saving unit 122.

In the present embodiment, the circumscribed rectangle of the white pixel cluster that satisfies all the first to third conditions described above is specified as a recognized cell, but the determination conditions are not limited to those. For example, it may also be possible to specify the circumscribed rectangle of the white pixel cluster that satisfies at least one of the first to third conditions as a recognized cell.

(5) Specification of Character Area Within Recognized Cell

The control unit 123 determines whether there is a black pixel cluster surrounded by a white pixel cluster inscribed in each recognized cell inside each recognized cell. Then, in the case of determining that there is a black pixel cluster, the control unit 123 sets circumscribed rectangles for all the black pixel clusters determined to exist.

Further, in the case of setting a plurality of circumscribed rectangles in one recognized cell, the control unit 123 determines whether the distance between circumscribed rectangles is smaller than or equal to a predetermined threshold value. Specifically, the control unit 123 selects circumscribed rectangles one by one and detects a circumscribed rectangle whose distance from the selected circumscribed rectangle is smaller than or equal to a predetermined threshold. For example, the control unit 123 determines whether the distance between circumscribed rectangles is smaller than or equal to 20 pixels.

Further, in the case of detecting such a circumscribed rectangle, the control unit 123 integrates the detected circumscribed rectangle and the selected circumscribed rectangle. That is, the control unit 123 deletes the selected circumscribed rectangle and the detected circumscribed rectangle as well as setting a new circumscribed rectangle that circumscribes both the circumscribed rectangles.

After the setting of a new circumscribed rectangle and the deletion of the two circumscribed rectangles are completed, the control unit 123 selects the circumscribed rectangles within the recognized cell again one by one from the beginning and integrates circumscribed rectangles whose distance therebetween is smaller than or equal to a predetermined threshold value. The above processing is repeated. That is, until there are no circumscribed rectangles whose distance therebetween is smaller than or equal to a predetermined threshold value, the integration of circumscribed rectangles is repeated.

As above, in the present embodiment, integration of circumscribed rectangles existing inside one recognized cell is performed, but integration of circumscribed rectangles existing in different recognized cells is not performed.

The circumscribed rectangle that is still set after the above processing is completed is called a character area (or text block). The above processing is called specification of a character area within a recognized cell. The control unit 123 saves position information on the character area existing inside a recognized cell in the saving unit 122 in association with the recognized cell.

In the case in FIG. 12, symbols 1205 and 1206 indicate character areas. The position information on the character area 1205 is saved in the saving unit 122 in association with the recognized cell 1203. Further, the position information on the character area 1206 is saved in the saving unit 122 in association with the recognized cell 1204.

(6) Character Recognition

The control unit 123 acquires a recognized character corresponding to each character area by performing character recognition for each character area. Here, the "recognized character" is a character code obtained by performing character recognition for the original character (character image in the scanned image) and the recognized character is embedded in the PDF file as a transparent character string. The recognized character acquired by the character recognition is saved in the saving unit 122 in association with the corresponding character area. By doing so, the recognized character is also associated with the recognized cell associated in advance with the character area. In the case where the character recognition is not performed, or in the case where the character recognition has failed, there is no recognized character that is associated with the character area.

Further, there is a case where the recognition rate is also acquired at the time of performing the character recognition. The recognition rate is an index indicating whether a character is recognized correctly and is saved in the saving unit 122 in association with the recognized character.

(7) Embedment of Transparent Character String

In the case where the input data is an image, first, the control unit 123 creates a PDF file newly and stores the scanned image therein and on the other hand, in the case where the input data is a PDF file, the control unit 123 temporarily deletes all the transparent character strings included in the PDF file. After this, the control unit 123 adds the recognized character acquired by (6) Character recognition described above to the PDF file as a transparent character string at the position of the corresponding character area.

Here, the case where the processing of (1) to (7) described above is performed by the control unit 123 of the information processing apparatus 120 is explained, but it may also be possible to perform the processing by the control unit 114 of the copy machine 110. In such a case, the copy machine 110 creates an SPDF file.

<About SPDF File Creation Processing Accompanied by PDF File Determination Processing>

Figure 4B:
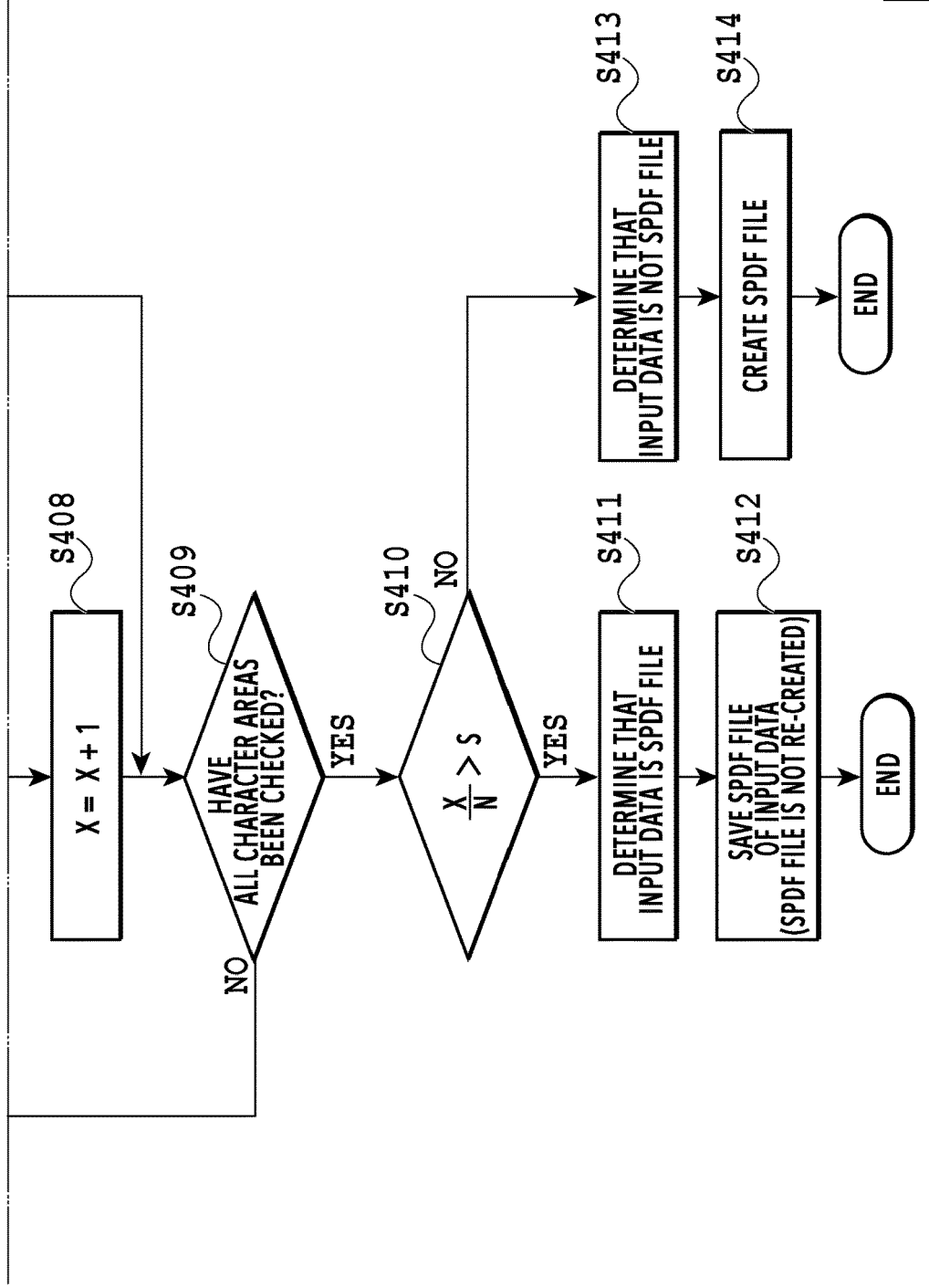

In the following, SPDF file creation processing accompanied by PDF file determination processing to determine whether the PDF file of the input data is an SPDF file, which is performed in the case where a user gives instructions to create an SPDF file based on the input data, is explained by using FIG. 4A and FIG. 4B.

At step S401, in the case where the input data is a PDF file, the control unit 123 determines whether a scanned image is included in the PDF file by determining whether an image whose size corresponds to a page size is included within the PDF file. In the case where an image whose size corresponds to the page size is included in the PDF file, it is determined that a scanned image is included in the PDF file and the processing advances to step S404. On the other hand, in the case where an image whose size corresponds to the page size is not included in the PDF file, it is determined that a scanned image is not included in the PDF file and the processing advances to step S402. Specifically, in the present embodiment, at step S401, first, a width x [mm] and a height y [mm] of the page are acquired from the PDF file, and then, whether there is an image whose width is x-5 [mm] or greater and whose height is y-5 [mm] or greater within the PDF file is determined. Here, 5 is an error that can be accepted. As described above, at this step, it is taken into consideration that there is a case where a margin is included at the time of creating a PDF file from a scanned image. That is, even though the page size and the image size do not match perfectly with each other, in the case where there is an image whose size is close to the page size to certain extent, it is determined that a scanned image is included in the PDF file. In the present embodiment, the error that can be accepted is set to 5 [mm], but it may also be possible to appropriately change the value in accordance with the scan environment.

First, the case where an image whose size corresponds to the page size is not included within the PDF file (case of NO at step S401) is explained. In this case, at step S402, the control unit 123 determines that the PDF file of the input data is not an SPDF file. Next, at step S403, the control unit 123 creates an SPDF file by performing OCR processing for the input data and by embedding a character code obtained as the results thereof as a transparent character string, and saves the created SPDF file in the saving unit 122.

Following the above, the case where an image whose size corresponds to the page size is included within the PDF file (YES at step S401) is explained. In this case, at step S404, the control unit 123 extracts a character area by performing area division for the image. It is assumed that the total number of character areas obtained at this step is N.

At step S405, the control unit 123 initializes a parameter X for counting the character area whose position and size match with those of the transparent character string and sets the parameter X to 0.

At step S406, the control unit 123 focuses attention on one of unchecked character areas (selection of character area of interest).

At step S407, the control unit 123 determines whether there exists a transparent character string whose position and size match with those of the character area of interest. In the case where the determination results at step S407 are affirmative, the processing advances to step S408. On the other hand, in the case where the determination results are negative, the processing advances to step S409. At this step, by also taking into consideration the shift in a scan and the like, it may also be possible to determine that the position and size of the character area of interest match with the position and size of the transparent character string even in the case where the positions and sizes do not match perfectly. For example, it may also be possible to determine that both match with each other even though there is a difference within a range of about ±1 mm.

In the case of YES at step S407, the control unit 123 increments X at step S408 and the processing advances to step S409. In contrast to this, in the case of NO at step S407, X is not incremented and the processing advances to step S409.

At step S409, the control unit 123 determines whether all the character areas have been checked. In the case where the determination results at step S409 are affirmative, the processing advances to step S410. On the other hand, in the case where the determination results are negative, the processing returns to step S406.

As described above, in the present embodiment, at step S405 to step S409, the number of character areas whose position and size match with those of the transparent character string is counted.

At step S410, the control unit 123 determines whether expression (1) below is satisfied. In the case where the determination results at step S410 are affirmative, the processing advances to step S411. On the other hand, in the case where the determination results are negative, the processing advances to step S413.

[Mathematical expression]

$$X/N > S \qquad \text{expression (1)}$$

In expression (1), S is a threshold value for determining whether the input data is an SPDF file and in the case where the number of character areas whose position and size match with those of the transparent character string is larger than this threshold value, it is determined that the input data is an SPDF file. In the present embodiment, S is set to 0.9. Setting S to 0.9 means that the input data is determined to be an SPDF file in the case where the ratio of the character areas whose position and size match with those of the transparent character string to the character areas is higher than or equal to 90%. The reason S is set to 0.9 instead of 1.0 is to take into consideration that it is not always possible to recognize a character with a recognition rate of 100% because of a reduction in scan accuracy in accordance with the environment. As a matter of course, it may also be possible to change the value of S in accordance with the environment.

In the case where expression (1) is satisfied (YES at step S410), at step S411, the control unit 123 determines that the input data is an SPDF file. Next, at step S412, the control unit 123 saves the SPDF file of the input data in the saving unit 122 as it is without re-creating an SPDF file and the series of processing terminates.

In contrast to this, in the case where expression (1) is not satisfied (NO at step S410), at step S413, the control unit 123 determines that the input data is not an SPDF file. Next, at step S414, the control unit 123 creates an SPDF file by performing OCR processing for the input data and embedding a character code obtained as the results of the OCR processing as a transparent character string, and saves the created SPDF file in the saving unit 122. The above is the contents of the SPDF file creation processing accompanied by the PDF file determination processing.

By the present embodiment, without the need to use a command for reporting that the file is a searchable file, it is possible to determine that the PDF file of the input data is an SPDF file with a high accuracy. Further, in the case where the input data is already an SPDF file, the SPDF file is saved in the saving unit as it is and an SPDF file is not re-created. Consequently, it is possible to reduce wasteful processing.

Second Embodiment

In the present embodiment, in the case where it is determined that the input data is an SPDF file (YES at step S410→step S411), a user is caused to select whether or not to re-create an SPDF file. In the following, differences from the already-described embodiment are explained mainly and explanation of the same contents as those of the already-described embodiment is omitted appropriately.

Even though the input data is already an SPDF file, there is a case where the accuracy of character recognition improves by performing character recognition again in the information processing apparatus 120. For example, in the case where the character recognition engine mounted in the information processing apparatus 120 is excellent in performance, there is a possibility that the accuracy of character recognition improves by performing character recognition again in the information processing apparatus 120. On the other hand, in the case where the character recognition engine that has created the original SPDF file is more excellent in performance than the character recognition engine mounted in the information processing apparatus 120, the accuracy of character recognition does not improve even by performing character recognition again in the information processing apparatus 120. Further, the processing of character recognition requires a certain time, and therefore, from the viewpoint of performance, it is not preferable to always re-create an SPDF file. As described above, re-creating an SPDF file has merits and demerits and the merits and demerits depend on the user environment, and therefore, it is made possible for a user to select whether or not to re-create an SPDF file.

Figure 5:
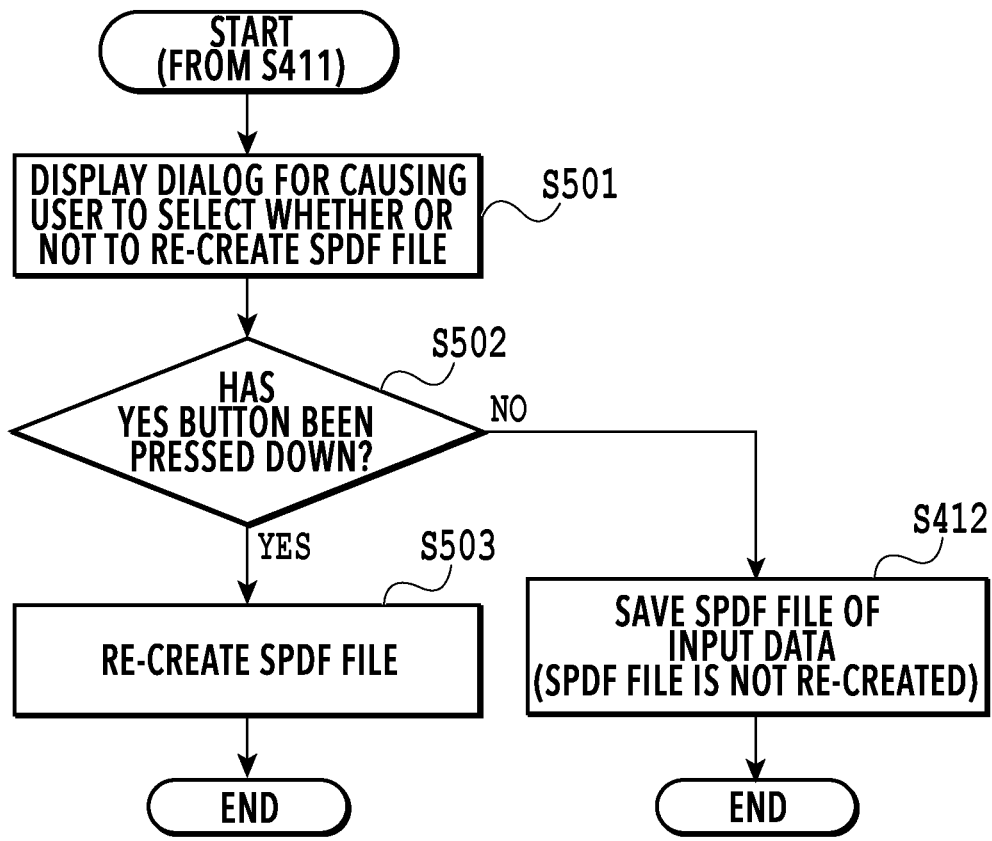
FIG. 5 is a flowchart of processing in a second embodiment.

In the following, processing in the present embodiment is explained by using FIG. 5.

Figure 6:
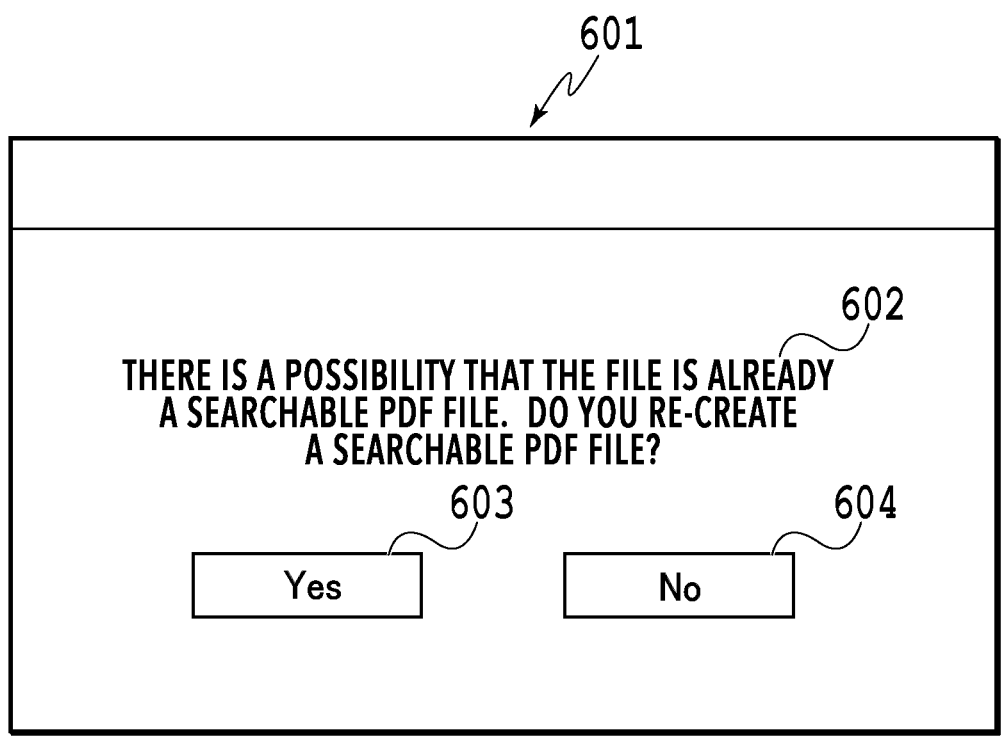
FIG. 6 is a diagram showing an example of a dialog making an inquiry about whether to re-create an SPDF file.

In the case where it is determined that the input data is an SPDF file at step S411, the control unit 123 displays a dialog for causing a user to select whether or not to re-create an SPDF file on the display unit 124 at step S501. FIG. 6 is a diagram showing an example of a dialog that is displayed at this step. A dialog 601 has a message 602 making an inquiry about whether or not to re-create an SPDF file. Further, the dialog 601 has a Yes button 603 that a user presses down in the case of creating an SPDF file and a No button 604 that a user presses down in the case of not creating an SPDF file.

At step S502, the control unit 123 determines whether or not the Yes button 603 of the dialog 601 has been pressed down. In the case where the determination results at step S502 are affirmative, the processing advances to step S503. On the other hand, in the case where the determination results are negative (that is, in the case where the No button 604 has been pressed down), the processing advances to step S412.

In the case where the Yes button 603 has been pressed down (YES at step S502), at step S503, the control unit 123 re-creates an SPDF file and saves the re-created SPDF file in the saving unit 122.

By the present embodiment, in the case where it is determined that the input data is an SPDF file, it is made possible to cause a user to select whether or not to re-create an SPDF file.

Third Embodiment

In the present embodiment, at the time of re-creating an SPDF file, the transparent character string having no relation to the contents of the image is not deleted but left.

Figure 3:
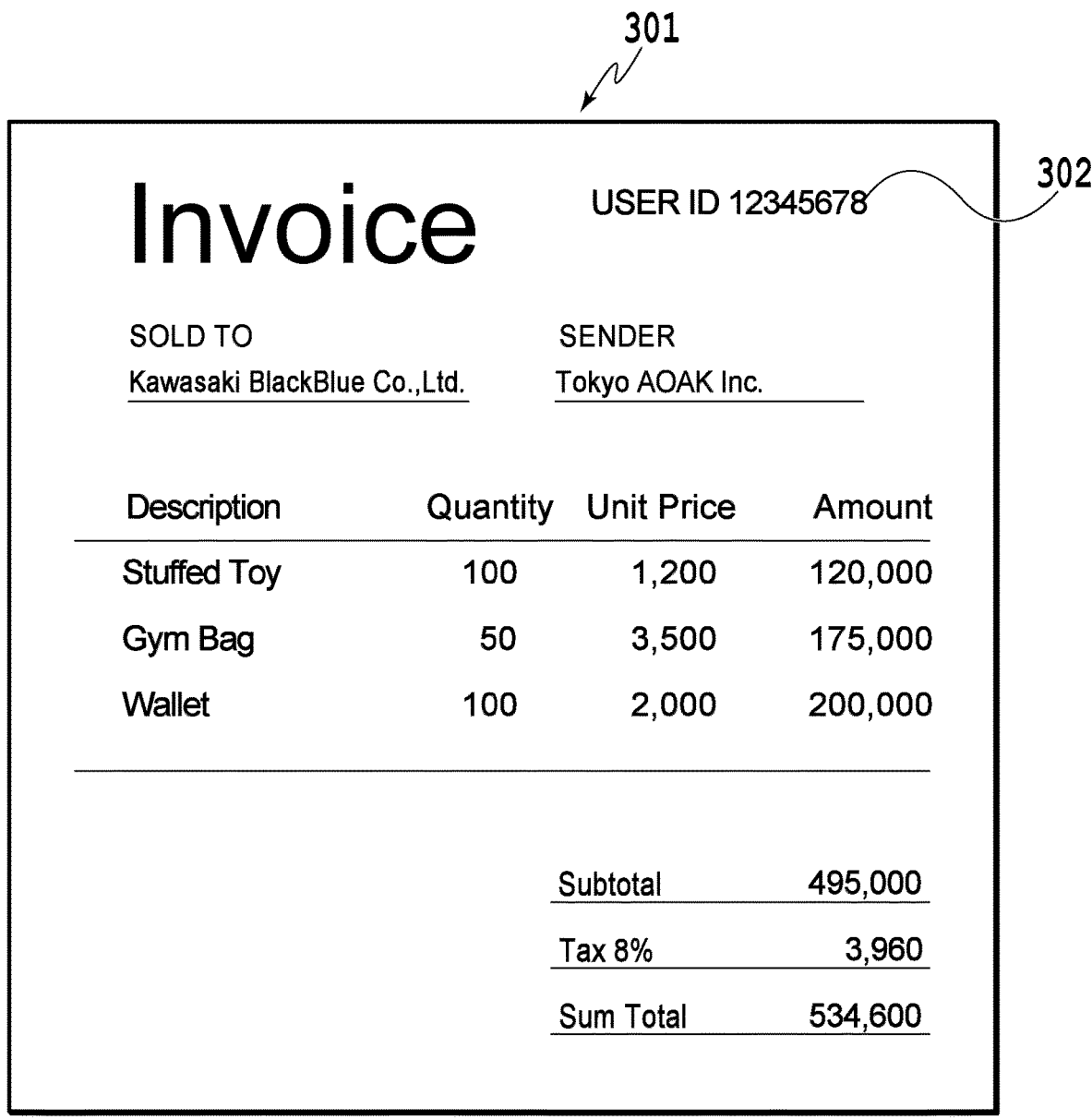
FIG. 3 is a diagram showing an example in which a transparent character string having no relation to contents of an image is embedded.
Figure 7:
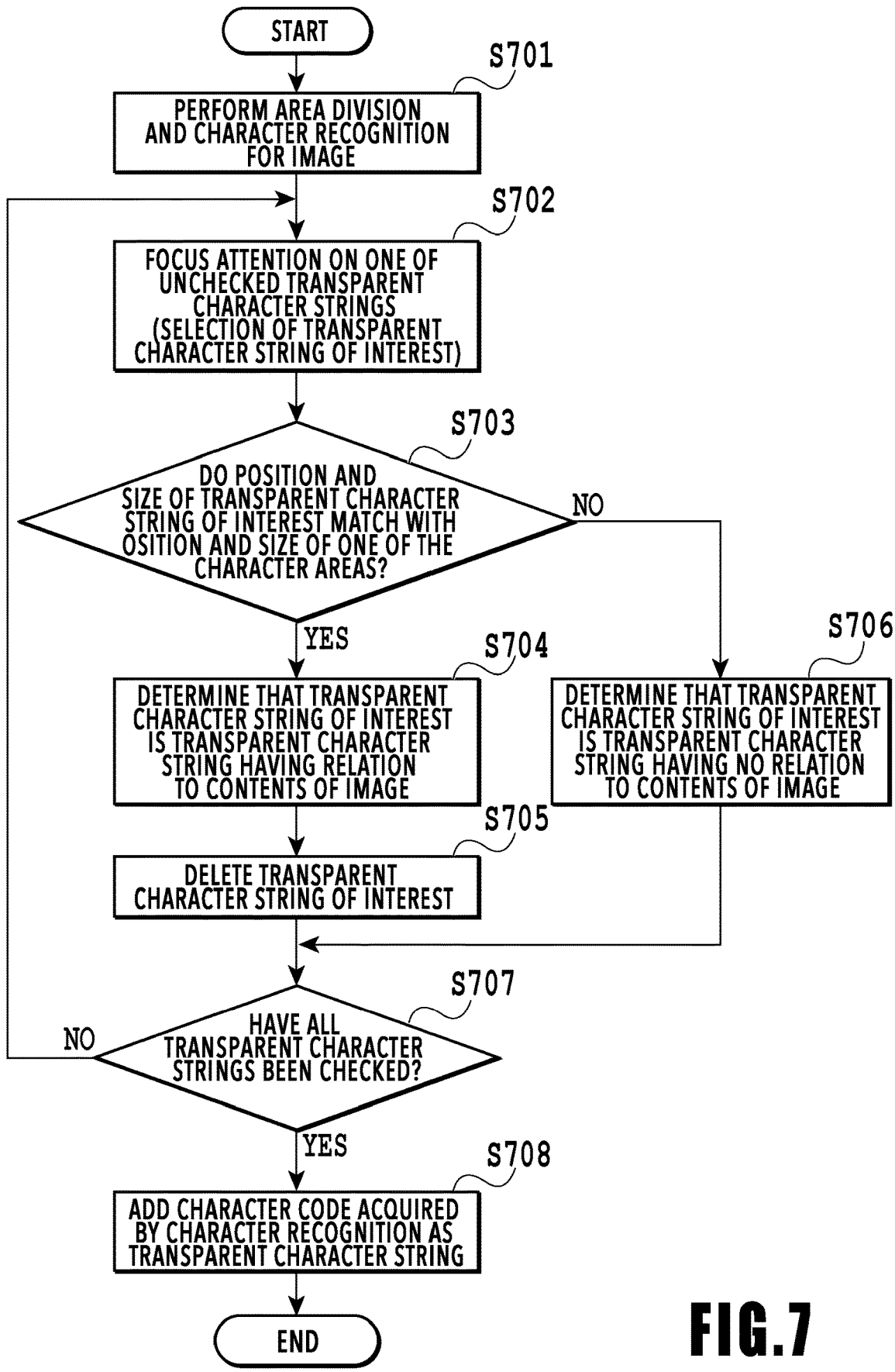
FIG. 7 is a flowchart of processing in a third embodiment.

In the case where an SPDF file is re-created based on the SPDF file of the input data, normally, the transparent character string embedded originally is temporarily deleted and a character code newly acquired is embedded as a transparent character string. However, in the case where such processing is performed for the SPDF file in which a transparent character string having no relation to the contents of the image as in FIG. 3 exists, the transparent character string is deleted and disappears. Because of this, in the present embodiment, at the time of temporarily deleting a transparent character string, a transparent character string having no relation to the contents of the image is not deleted. In the following, processing to re-create an SPDF file in the present embodiment is explained by using FIG. 7.

First, at step S701, the control unit 123 performs area division and character recognition for the image of the input data and saves information obtained as the results thereof in the saving unit 122.

At step S702, the control unit 123 focuses attention on one of unchecked transparent character strings (selection of transparent character string of interest).

At step S703, the control unit 123 determines whether the position and size of the transparent character string of interest match with the position and size of one of the character areas acquired at step S701. In the case where the determination results at step S703 are affirmative, the processing advances to step S704. On the other hand, in the case where the determination results are negative, the processing advances to step S706. At this step, by also taking into consideration the shift in a scan and the like, it may also be possible to determine that the position and size of the transparent character string of interest match with the position and size of one of the character areas even in the case where the positions and sizes do not match perfectly.

In the case where the position and size of the transparent character string of interest match with those of one of the character areas (YES at step S703), at step S704, the control unit 123 determines that the transparent character string of interest is a transparent character string having relation to the contents of the image, that is, the transparent character string is a transparent character string for search. Next, at step S705, the control unit 123 deletes the transparent character string of interest and the processing advances to step S707.

In contrast to this, in the case where the character area whose position and size match with the position and size of the transparent character string of interest does not exist (NO at step S703), at step S706, the control unit 123 determines that the transparent character string of interest is a transparent character string having no relation to the contents of the image. Next, the processing advances to step S707.

At step S707, the control unit 123 determines whether all the transparent character strings have been checked. In the case where the determination results at step S707 are affirmative, the processing advances to step S708. On the other hand, in the case where the determination results are negative, the processing returns to step S702.

At step S708, the control unit 123 adds the character coded acquired by the character recognition as a transparent character string. The above is the contents of the processing to re-create an SPDF file in the present embodiment.

By the present embodiment, it is possible to leave a transparent character string having no relation to the contents of the image without deleting the transparent character string at the time of re-creating an SPDF file.

Fourth Embodiment

In the present embodiment, it is made possible for a user to select whether or not to leave a transparent character string having no relation to the contents of the image without deleting the transparent character string.

Figure 8:
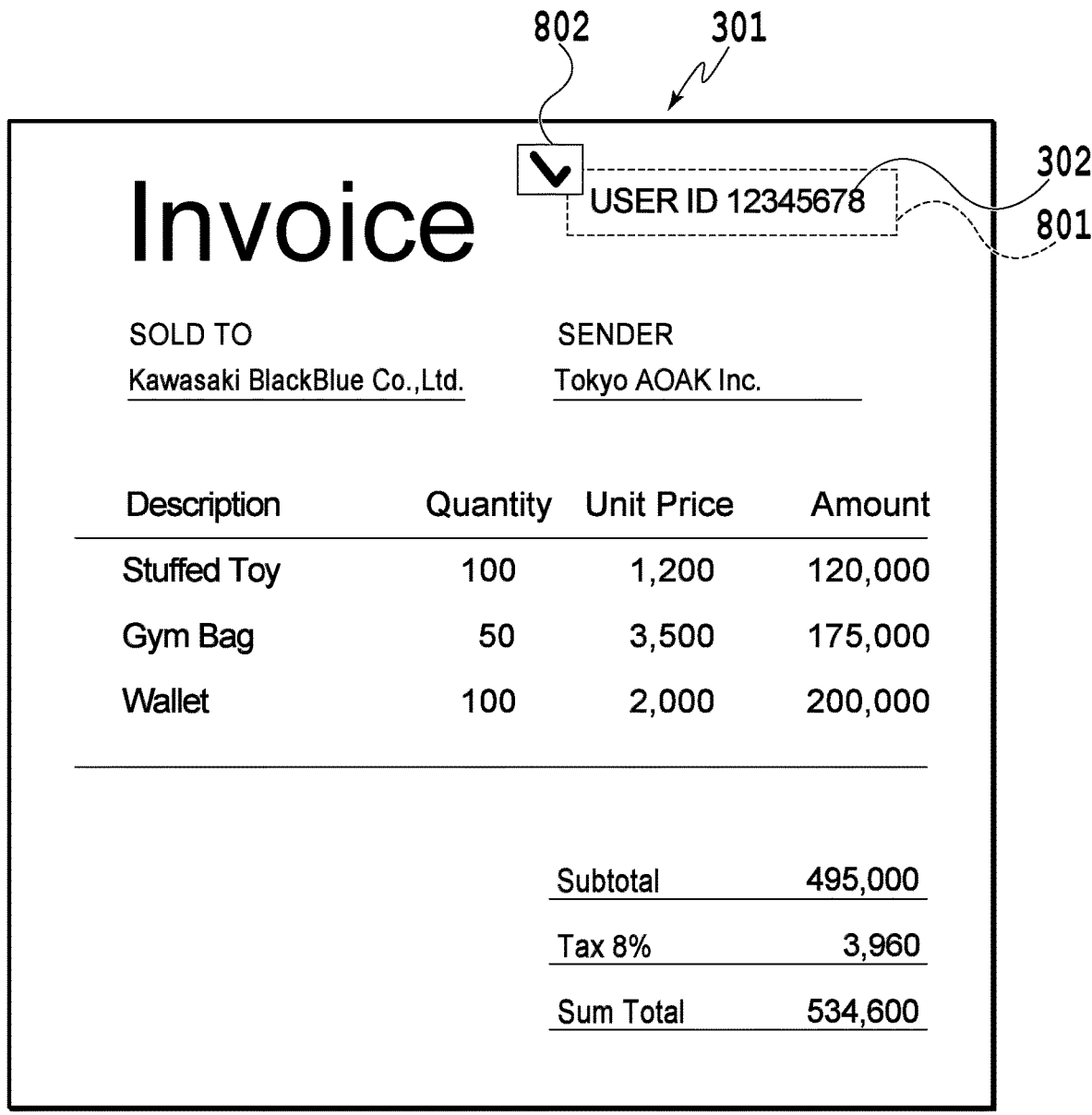
FIG. 8 is a diagram showing an example of a screen on which to select whether to delete a transparent character string.

FIG. 8 is a diagram showing an example of a screen displayed on the display unit 124 by the control unit 123 at the time of causing a user to select whether or not to delete a transparent character string having no relation to the contents of the image. In the case of FIG. 8, by the control unit 123 detecting the transparent character string 302 having no relation to the contents of the image and displaying a circumscribed rectangle 801 thereof, the transparent character string 302 is highlighted. Further, although not shown schematically, by temporarily displaying the transparent character string 302 in a semitransparent state, it is made possible for a user to visually recognize the transparent character string 302. Furthermore, in the vicinity of the transparent character string 302, a checkbox 802 is displayed. In the case where a user checks the checkbox 802, the transparent character string 302 is deleted at the time of re-creating an SPDF file.

<About Screen Creation Processing>

Figure 9A:
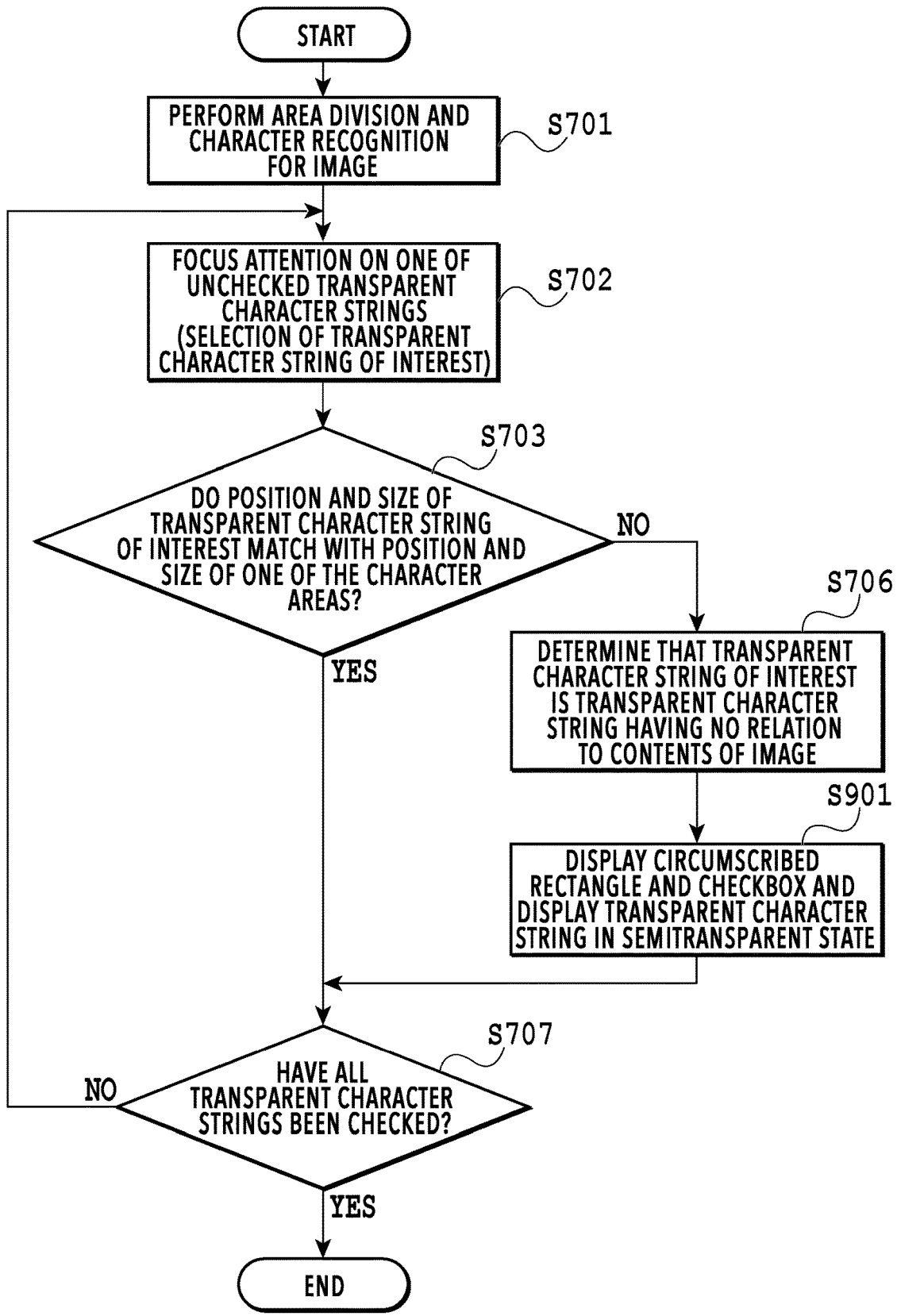
FIG. 9A and FIG. 9B are flowcharts of processing in a fourth embodiment.

In the following, processing to create a screen as illustrated in FIG. 8 is explained by using FIG. 9A.

In the screen creation processing in the present embodiment, after it is determined that the transparent character string of interest is a transparent character string having no relation to the contents of the image at step S706, the processing advances to step S901. Then, at step S901, the control unit 123 displays the transparent character string of interest in a semitransparent state as well as displaying the circumscribed rectangle corresponding to the transparent character string of interest and the checkbox on the display unit 124.

<About SPDF File Creation Processing>

Figure 9B:
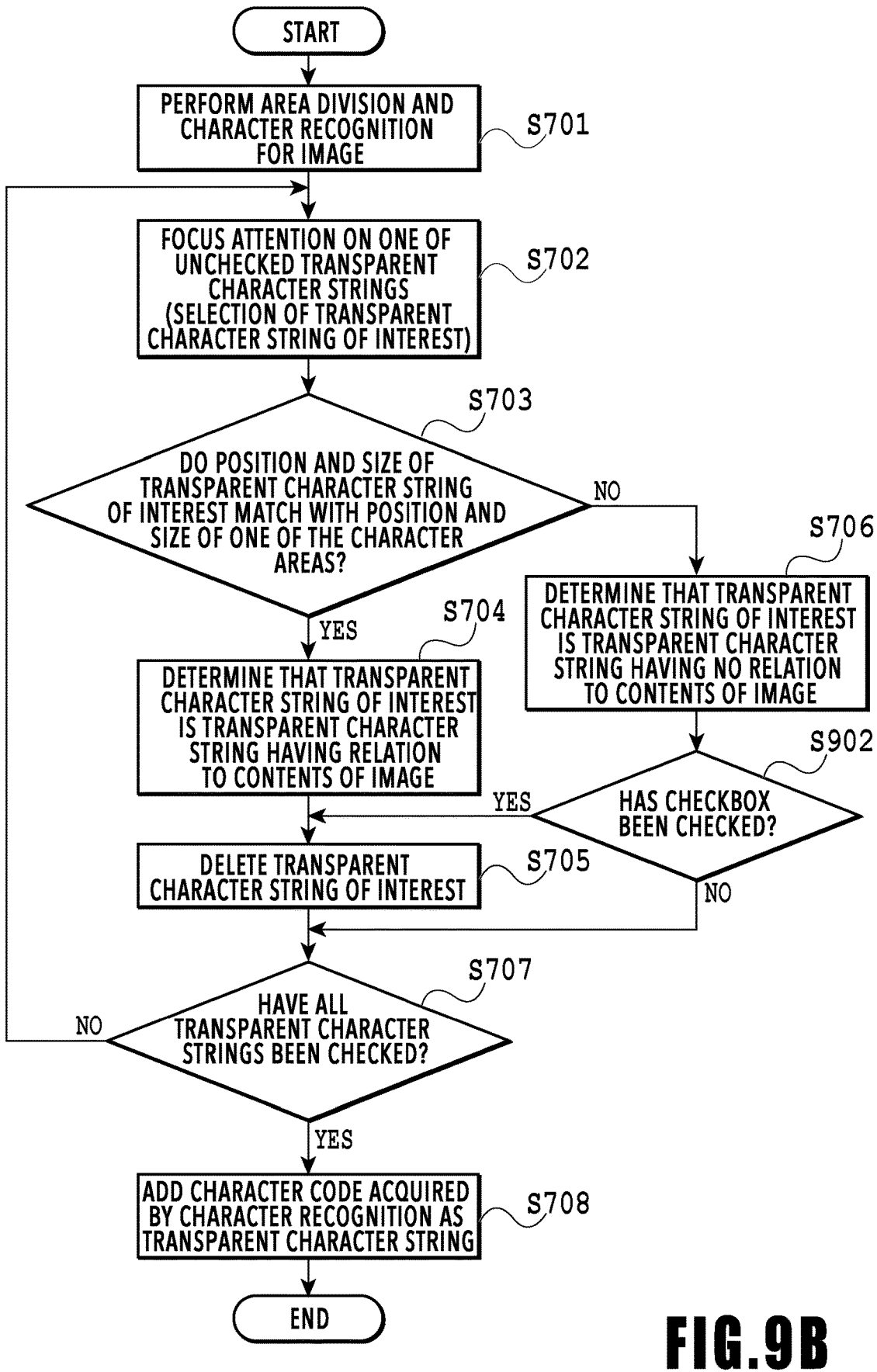

In the following, SPDF file creation processing in the present embodiment is explained by using FIG. 9B.

In the SPDF file creation processing in the present embodiment, after it is determined that the transparent character string of interest is a transparent character string having no relation to the contents of the image at step S706, the processing advances to step S902. Then, at step S902, the control unit 123 determines whether the checkbox corresponding to the transparent character string of interest has been checked. In the case where the determination results at step S902 are affirmative, the processing advances to step S705 and the transparent character string of interest is deleted. On the other hand, in the case where the determination results are negative, the processing advances to step S707. In this case, the transparent character string of interest is not deleted. That is, in the present embodiment, the transparent character string having no relation to the contents of the image is not necessarily deleted, but the transparent character string is deleted in accordance with the selection of a user.

By the present embodiment, it is made possible for a user to select whether or not to leave the transparent character string having no relation to the contents of the image without deleting the transparent character string.

Fifth Embodiment

In the present embodiment, only a character string whose recognition rate is high is replaced with a transparent character string at the time of re-creating an SPDF file. As described above, at the time of re-creating an SPDF file, character recognition is performed after temporarily deleting the already-existing transparent character string and then a transparent character string is added. However, in the case where the recognition rate is low, the possibility that the recognition accuracy deteriorates compared to that at the time of acquiring the already-existing transparent character string is strong. Because of this, in the present embodiment, only a character string whose recognition rate is higher than or equal to a threshold value is replaced with a transparent character string.

Figure 10:
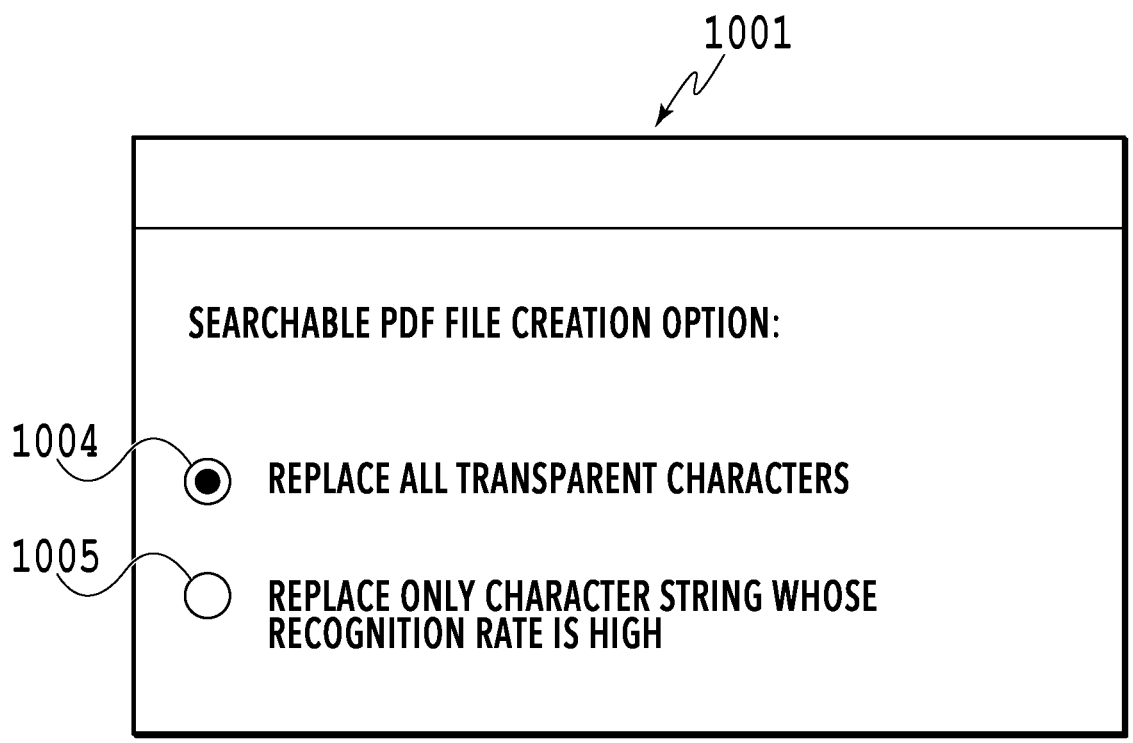
FIG. 10 is a diagram showing an example of a screen on which to set an option at the time of creating an SPDF file.

FIG. 10 is a diagram showing an example of a dialog for setting an option at the time of creating an SPDF file. An option setting dialog 1001 has a checkbox 1004 that is checked in the case where all the transparent characters are replaced and a checkbox 1005 that is checked in the case where only a character string whose recognition rate is high is replaced. A user checks one of the checkbox 1004 and the checkbox 1005.

<About SPDF File Creation Processing>

In the following, SPDF file creation processing that is performed in the case where the checkbox 1005 within the option setting dialog 1001 is checked in the present embodiment is explained by using FIG. 11A and FIG. 11B.

In the present embodiment, after step S704, the processing advances to step S1101 and at step S1101, the control unit 123 determines whether the recognition rate of the recognized character corresponding to the transparent character string of interest is higher than or equal to a predetermined threshold value. In the case where the determination results at step S1101 are affirmative, the processing advances to step S705 and the transparent character string of interest is deleted. On the other hand, in the case where the determination results are negative, the processing advances to step 707. As described above, at this step, only a character string whose recognition rate is high is replaced with a transparent character string at step S1102 that follows, and therefore, the already-existing transparent character string whose recognition rate is high is deleted in advance.

Further, in the present embodiment, after step S707, the processing advances to step S1102 and at step S1102, the control unit 123 adds a recognized character of the recognized characters, whose recognition rate is higher than or equal to a predetermined threshold value, as a transparent character string, and the series of processing is terminated. The above is the contents of the SPDF file creation processing in the present embodiment.

By the present embodiment, it is possible to replace only a character string whose recognition rate is high with a transparent character string at the time of re-creating an SPDF file.

Sixth Embodiment

Figure 13A:
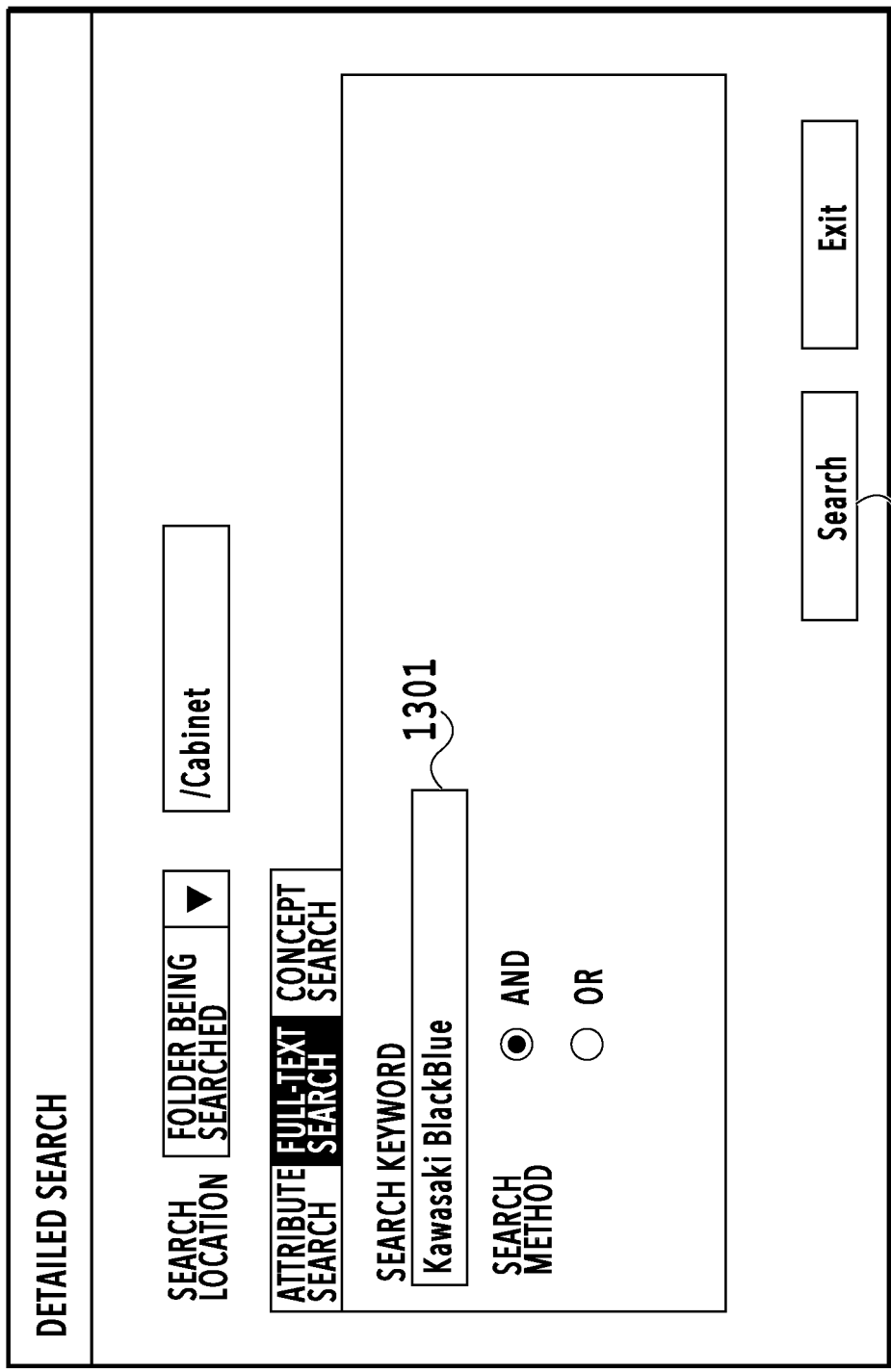
FIG. 13A and FIG. 13B are diagrams each showing an example of a screen that is displayed in search processing in a sixth embodiment.
Figure 13B:
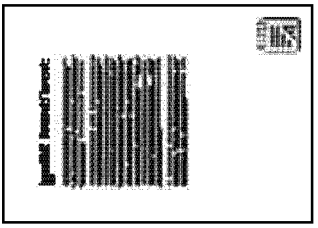

In the present embodiment, an example of a method of making use of an SPDF file generated by the method explained in the above-described embodiment is described. In the present embodiment, a mechanism to search for each file in detail, which is saved in the saving unit 123 and the like, is provided. Further, a mechanism to print a file that is found in a search by using the copy machine 110 is provided. FIG. 13A and FIG. 13B are each a diagram showing an example of a screen that is displayed on the display unit 124 of the information processing apparatus 120. FIG. 13A is a diagram showing an example of a screen on which a search word is input and FIG. 13B is a diagram showing an example of a screen showing a list of search results. The screens shown in FIG. 13A and FIG. 13B are screens provided by a document management application that manages a generated SPDF file, a document file inside a computer, and so on. It is possible for a user to perform an attribute search, a full-text search, a concept search, and so on, of a file via the screens in FIG. 13A and FIG. 13B.

In the present embodiment, the full-text search of a file including an SPDF is explained. An area 1301 is an area in which a search keyword is input. It is possible for a user to input a keyword that the user desires to search for in the area 1301. A checkbox of Search method is a checkbox for specifying whether each keyword is searched for by AND or OR. A Search key 1302 is a key that is pressed down at the time of performing a search.

FIG. 13B is a screen showing an example of search results. Here, a case is illustrated where three files including two search keywords "Kawasaki" and "BlackBlue" are found and displayed in a list. Symbol 1303 illustrates the way the SPDF file in FIG. 2 is specified of the three found files. It is possible for a user to open, print, and so on, the file found by the search via the screen in FIG. 13B.

Figure 14:
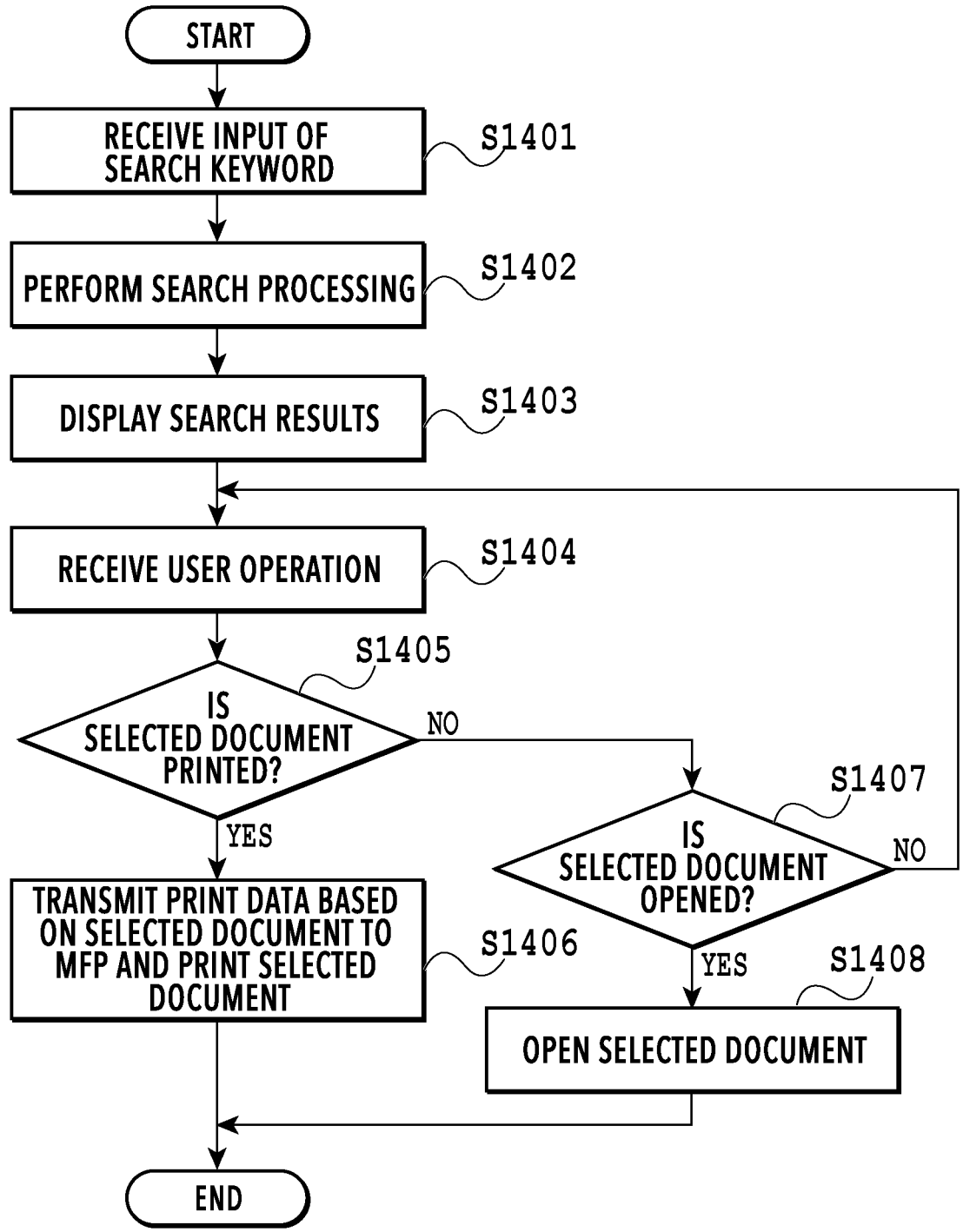
FIG. 14 is a flowchart of search control processing in the sixth embodiment.

A specific control method is explained by using FIG. 14. A flowchart in FIG. 14 is performed in accordance with reception of a user operation of a file search via the management screen of the document management application.

At step S1401, the control unit 123 receives an input of a search keyword via the reception unit 125. In the case where pressing down of the Search key 1302 is detected after reception of an input of a search keyword, the processing advances to step S1402.

At step S1402, the control unit 123 searches the character strings within files located within a search-target storage based on the keyword input at step S1401. In the case where there is a file in which the keyword is included in a character string within the file, the control unit 123 acquires attribute information on the file as a display target. In the case where the search of the files within the storage is completed, the processing advances to step S1403. In the present embodiment, the case is supposed where a search is performed by directly referring to an SPDF file, a WORD file, an excel file, and so on, but the case is not limited to this. For example, it may also be possible to generate a database in advance in which character strings within files are indexed and to refer to the generated database.

At step S1403, the control unit 123 displays a screen showing a list of search results found at step S1402. FIG. 13B is an example of a screen showing a list of search results.

At step S1404, the control unit 123 receives a user operation to select a document from the list of search results. In the selection of a document at this step, it is also possible for a user to select a plurality of document files.

At step S1405, the control unit 123 determines whether a user operation to print the selected document is received. In the case where the determination results at this step are affirmative, the processing advances to step S1406. On the other hand, in the case where the determination results are negative, the processing advances to step S1407.

At step S1406, the control unit 123 generates print data based on the selected document and transmits the generated print data to an MFP (for example, the copy machine 110). The MFP having received this print data forms an image on a printing medium, such as a sheet, based on the received print data.

At step S1407, the control unit 123 determines whether a user operation to open the selected document is received. In the case where the determination results at this step are affirmative, the processing advances to step S1408. On the other hand, in the case where the determination results are negative, the processing returns to step S1404.

At step S1408, the control unit 123 opens the selected document by an application associated with the extension of the selected document.

As explained above, in the present embodiment, it is possible to perform a full-text search of a document file in the SPDF format stored inside the information processing apparatus 120. Consequently, it is made possible for a user to easily search for material that the user requires. Further, it is possible to print the document file found by the search in conjunction with the copy machine 110. Consequently, it is possible to easily search for a desired file from a variety of document files managed on the information processing apparatus and to perform reprinting. Consequently, it is possible to improve convenience of a user.

Other Embodiments

In each embodiment described above, the case is illustrated where the information processing apparatus 120 and the copy machine 110 are connected by a wire or wirelessly, but the case is not limited to this, For example, it may also be possible to implement each function of the information processing apparatus 120 that generates an SPDF, manages each document file, and so on, as a server on a cloud. In this case, data read by a copy machine and the like is transmitted to a server on a cloud, and converted into an SPDF file as needed, and stored in a cloud storage. Further, a server on a cloud provides a Web application that can be accessed from a Web browser and the like of a client PC. In this case, it is assumed that a user makes use of the function of full-text search and the print function of a document file found by a search, explained in the sixth embodiment, via the Web application.

Further, in the present embodiment, the PDF is illustrated as an example of a file that is converted into a searchable file, but the example is not limited to this. It may also be possible to analyze a file in another format (for example, XPS format proposed by Microsoft, XDW format used in DocuWorks document proposed by Xerox) and to convert into a searchable file.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

By the present invention, it is made possible to determine with a high accuracy whether a PDF file is an SPDF file without using a command for reporting that a file is a searchable file.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-193518, filed Oct. 3, 2017, and No. 2018-139489 filed Jul. 25, 2018, which are hereby incorporated by reference wherein in their entirety.

What is claimed is:

1. An information processing apparatus comprising:
at least one memory device that stores a set of instructions; and
at least one processor that executes the instructions, the instructions, when executed, causing the information processing apparatus to perform operations comprising:
determining whether a PDF (Portable Document Format) file includes an image whose size corresponds to a page size by analyzing the PDF file;
responding to a determination that the PDF file includes an image whose size corresponds to the page size by extracting a character area from the image;
determining whether a position and size of the extracted character area match to a position and size of a transparent character string, the transparent character string being included in the PDF file; and
responding to a determination that the position and size of the extracted character area match to the position and size of the transparent character string by determining that the PDF file is a searchable PDF file.

2. The apparatus according to claim 1, wherein the operations further comprise determining that the PDF file is not a searchable PDF file based on a determination that the position and size of the extracted character area do not match to the position and size of the transparent character string.

3. The apparatus according to claim 2, wherein the operations further comprise creating a searchable PDF file by performing an OCR process on the extracted character, based on the determination that the PDF file is not a searchable PDF file.

4. The apparatus according to claim 1, wherein the operations further comprise displaying on a display a message based on the determination that the PDF file is a searchable PDF file.

5. The apparatus according to claim 4, wherein the message includes a query as to whether or not to re-create a searchable PDF file, and wherein the operations further comprise:
   not creating a searchable PDF file responsive to a negative response to the query; and
   re-creating a searchable PDF file responsive to an affirmative response to the query.

6. An information processing apparatus comprising:
   at least one memory device that stores a set of instructions; and
   at least one processor that executes the instructions, the instructions, when executed, causing the information processing apparatus to perform operations comprising:
      determining whether a PDF (Portable Document Format) file includes an image whose size corresponds to a page size by analyzing the PDF file;
      responding to a determination that the PDF file includes an image whose size corresponds to the page size by extracting character areas from the image;
      determining whether a position and size of each of the extracted character areas match to a position and size of one of transparent character strings, the transparent character strings being included in the PDF file;
      counting a number of extracted character areas for which a position and size of the extracted character areas match to a position and size of one of the transparent character strings;
      determining whether the counted number of extracted character areas for which a position and size of the extracted character areas match to a position and size of one of the transparent character strings is greater than a threshold; and
      responding to a determination that the counted number is greater than the threshold by determining that the PDF file is a searchable PDF file.

* * * * *